Patented Jan. 18, 1927.

1,614,523

UNITED STATES PATENT OFFICE.

KENNETH F. COOPER, OF GREAT NECK, NEW YORK, ASSIGNOR TO AMERICAN CYANAMID COMPANY, OF NEW YORK, N. Y., A CORPORATION OF MAINE.

PROCESS OF PRODUCING HEAVY METAL CYANIDES.

No Drawing.   Application filed May 13, 1922. Serial No. 560,718.

This invention relates to a process of making heavy metal cyanides and has for its object to produce cyanides of heavy metals, such as copper and zinc, from a cheaper form of commercial cyanides than has heretofore been used in the preparation of high grade pure cyanide salts of such metals.

With these and other objects in view, the invention consists in the novel steps and combinations of steps constituting the process, all as will be more fully hereinafter disclosed and particularly pointed out in the claims.

In order that the precise invention may be the more clearly understood, it is said:

The production of commercial cyanide from commercial calcium cyanamid, or lime nitrogen, has recently been developed to such a point that it now offers a source of cyanogen compounds, which has found extended use in the metallurgy of the precious metals. A general idea of the process employed may be had from U. S. Patent #1,282,395, dated October 22, 1918, to H. P. Eastman, and entitled, "Alkali metal cyanide and process of producing the same", or Patent #1,359,257, dated Nov. 16, 1920, to W. S. Landis, and entitled "Cyanide compound and process of producing the same." The commercial cyanide produced in this manner, however, is not a pure product but consists essentially of mixtures of alkali earth metal, or alkali metal cyanides with common salt, carbonaceous materials and various minor impurities, such as iron, silica, sulphur and like compounds in small amounts derived from the limestone and the coke in the process of manufacturing the original calcium cyanamid.

The process herein proposed, on the other hand, takes such crude material and through the various steps to be described, treats it in such a manner as to eliminate the various impurities present, and turns out such high grade cyanides of the heavy metals chosen that they are found to equal the pure grades of the cyanides of these same metals that are found on the market.

The crude cyanide now commonly produced by fusing calcium cyanamid or lime nitrogen and common salt together, may contain a material proportion of calcium cyanide. It is therefore desirable in selecting the soluble salts of the heavy metals, to select only those which in turn by double decomposition produce soluble double salts of calcium, as for example chlorides, as the chloride salts of many of the heavy metals as well as of calcium, are soluble in water. Nitrates and acetates can be used with equal facility, but sulphates and carbonates are excluded from consideration in the precipitation stage of the process in the preferred operation of my invention which involves calcium containing raw materials, when substantially pure heavy metal cyanides are to be produced inasmuch as the sulphates and carbonates of calcium are insoluble and would not be removed from the finished product by the process to be described.

In carrying out this process, one may proceed as follows: A crude commercial cyanide such as that produced by following the above mentioned patents, and which may contain, for example, a cyanide of an alkali metal, or of an alkali earth metal or a mixture of these, and may also contain, for example, 25 per cent of cyanogen, is dissolved in water. The solution may be made by charging the dry commercial cyanide into water in a dissolving tank provided with an agitating means. The crude cyanide goes rapidly into solution. This crude cyanide is then filtered from the insoluble residue and the cake well washed, the washing liquors being returned to the process either for solution of a new batch or directly into the filtered liquor.

A solution of a suitable salt of a heavy metal of such character that the acid radical forms double soluble salts with calcium is then prepared by dissolving said heavy metal salt in water. In preparing copper cyanide, for example, a solution of cuprous chloride would be used. In preparing zinc cyanide a corresponding solution of zinc chloride would be prepared.

Into a vessel provided with an agitator one may now place a batch of said filtered simple cyanide solution and add to this solution a sufficient quantity of the chosen heavy metal salt to form a double cyanide of said heavy metal, which is soluble in water. For example, in case copper cyanide is to be produced, one would add sufficient cuprous chloride or other suitable copper salt to react with approximately one half of the cyanogen in the total cyanide present, thereby forming a double cyanide of copper and the original calcium or other cyanides employed which would be soluble in water. In such case a reaction would take place in accordance with the following equation:

$$2Ca(CN)_2 + 2CuCl = CaCu_2(CN)_4 + CaCl_2.$$

I would proceed in the same way in the case of the zinc salt, adding sufficient zinc chloride to react with approximately one half of the calcium or other simple cyanide in the tank. In this case of the use of zinc chloride, the reaction would be in accordance with the following equation:

$$2Ca(CN)_2 + ZnCl_2 = CaZn(CN)_4 + CaCl_2.$$

The quantity of heavy metal salt to be added in each case is easily determined, inasmuch as the required addition is just short of that which will produce a precipitation of a simple cyanide of the heavy metal being added.

I then agitate the contents of the tank and after thoroughly incorporating the two solutions I permit the batch to stand.

The resulting double cyanide solution is alkaline due to the excess of cyanide present, and in this alkaline solution any sulphur that may be present will be precipitated by the heavy metal added and the corresponding sulphide of the heavy metal settled to the bottom of the tank, for sulphides, ferro-cyanides, and cyanamids of most metals are not soluble in double cyanide solutions.

Iron is usually present in the form of a ferrocyanide in small quantities in the double cyanide solutions thus produced, but inasmuch as a ferrocyanide is a deleterious element, and must be removed in the preparation of high grade heavy metal cyanides, I have found that by the addition of a quantity of zinc salt equivalent to the ferro-cyanide present but insufficient to precipitate a simple cyanide, for example zinc chloride, that I can precipitate zinc ferrocyanide which also falls to the bottom of the tank along with the sulphides. This zinc addition forms a simple means of removing ferrocyanides from the double cyanide solution, and if the addition is carefully adjusted there is no zinc left in the resulting product.

I next permit the precipitates of sulphides and of zinc ferrocyanide to settle out and then decant the clear double cyanide liquor, passing the last of the settled liquor through a filter press or other separating means in order to insure a clear and clean solution for the next operation. I next add sufficient of the chosen heavy metal salt, for example, zinc chloride, or a copper chloride, as the case may be to cause a reaction between the clean double cyanide solution and said heavy metal salt, thus producing and precipitating the desired simple cyanide of the heavy metal. Should this last named addition of heavy metal salt be $Cu_2Cl_2$, a reaction with the purified double cyanide of calcium and copper will take place in accordance with the following equation:

$$CaCu_2(CN)_4 + Cu_2Cl_2 = 4CuCN + CaCl_2.$$

Having thus produced the substantially pure simple cyanide of the desired heavy metal as a precipitate, I next separate out said precipitate by sedimentation, filtration or other suitable means.

It will thus be observed that although the purification of cyanide solutions has proven difficult in the past, due largely to the soluble qualities of sulphides, ferro-cyanides, cyanamids, etc. in simple cyanide solutions, yet, I take advantage of their relatively insoluble properties in double cyanide solutions, precipitate them from said double cyanide solutions, and then convert the double cyanides back into simple cyanides of high degrees of purity.

It follows that an important feature of this invention resides in the addition to the simple crude cyanide solution of a sufficient quantity of the heavy metal cyanide solution to form a double cyanide solution, for the sulphides, ferro-cyanides, and cyanamids that are present and soluble in the simple cyanide solutions are insoluble in the double cyanide solutions and may be readily removed from the latter.

In other words, an important feature of this invention resides in the fact that the salt of the heavy metal whose simple cyanide is being prepared acts automatically to free the solution from sulphur. That is, since the sulphides of practically all metals except iron are more or less insoluble in double cyanide solutions, a precipitation of any sulphides present in the cyanide solution takes place as soon as one reaches the point at which the double cyanide forms. Therefore, if one adds a heavy metal salt solution until all the free simple cyanide present has been converted into a double cyanide the precipitation of the sulphides present is assured. In the case of iron, zinc chloride is sufficient to precipitate any of its cyanides that may be present as above pointed out.

The resulting heavy metal cyanide separated in this manner is dried and is ready for the market. It is of remarkable purity and finds ready application in the arts requiring such compounds.

My process as will be noted above is a comparatively simple one in that I merely make a solution of the crude commercial calcium cyanide, now in wide use; I separate the insoluble matter present by suitable means, add approximately one half the total quantity of heavy metal water soluble salt equivalent to the cyanide in solution to form a double cyanide and then add a small quantity of a precipitant such as zinc chloride, and let the impurities settle out, or I separate them out by well known means. I then add the rest of the heavy metal water soluble salt and precipitate the heavy metal simple cyanides, recovering them from their solutions and dry the resulting products. This process may be readily applied to suitable salts of the metals, copper, zinc, silver, gold, cadmium, mercury, and nickel. The above examples have been discussed with special reference to calcium cyanide but it is to be understood that they apply with equal force to sodium cyanide and to the other alkali metal and alkali earth metal cyanides.

It is obvious that those skilled in the art may vary the procedure as outlined above without departing from the spirit of the invention, and therefore I do not wish to be limited to this disclosure except as may be required by the claims.

What I claim is:

1. The process of making heavy metal cyanides which comprises providing a solution of a simple cyanide, adding thereto a soluble heavy metal salt in sufficient quantity to form therewith a soluble double cyanide decomposable by acids, filtering and treating the resulting solution with additional heavy metal salt to form the heavy metal cyanide.

2. The process of making heavy metal cyanides which comprises providing a solution of an alkaline metal cyanide, adding thereto a soluble heavy metal salt in sufficient quantity to form therewith a soluble double cyanide decomposable by acids, filtering and treating the resulting solution with additional heavy metal salt to form the heavy metal cyanides.

3. The process of making heavy metal cyanides which comprises providing a solution of an alkali earth metal cyanide, adding thereto a soluble heavy metal salt in sufficient quantity to form therewith a soluble double cyanide decomposable by acids, filtering and treating the resulting solution with additional heavy metal salt to form the heavy metal cyanide.

4. The process of making heavy metal cyanides which comprises providing a solution of an alkaline metal cyanide, adding thereto a soluble heavy metal salt in sufficient quantity to form therewith a soluble double cyanide decomposable by acids, filtering and treating the resulting solution with a salt of said heavy metal which forms a soluble compound with the metal of said alkaline metal cyanide to precipitate the heavy metal cyanide.

5. The process of making heavy metal cyanides which comprises providing a solution of an alkali earth metal cyanide, adding thereto a soluble heavy metal salt which forms a soluble salt with the alkali earth metal present and in sufficient quantity to form therewith a soluble double cyanide decomposable by acids, filtering and treating the resulting solution with a salt of said heavy metal which forms a soluble compound with the said alkali earth metal to precipitate the heavy metal cyanide.

6. The process of making heavy metal cyanides which comprises providing a solution of an alkaline metal cyanide, adding thereto a soluble heavy metal salt in sufficient quantity to form therewith a soluble double cyanide decomposable by acids, adding a salt to precipitate any iron present, filtering and treating the resulting solution with a salt of said heavy metal which forms a soluble compound with the metals of said alkaline metal cyanide to precipitate the heavy metal cyanide.

7. The process of making heavy metal cyanides which comprises providing a solution of an alkali earth metal cyanide, adding thereto a soluble heavy metal salt which forms a soluble salt with the alkali earth metal present and in sufficient quantity to form therewith a soluble double cyanide decomposable by acids, adding a zinc salt which forms a soluble compound with said alkali earth metal to precipitate any iron present, filtering and treating the resulting solution with a salt of said heavy metal which forms a soluble compound with the said alkali earth metal to precipitate the heavy metal cyanide.

8. The process of making heavy metal cyanides which comprises providing a solution of a cyanide containing calcium cyanide, adding thereto a soluble heavy metal salt which forms a soluble salt with calcium and in sufficient quantity to form therewith a soluble double cyanide decomposable by acids, filtering and treating the resulting solution with an additional quantity of said heavy metal salt to precipitate the heavy metal cyanide.

9. The process of making heavy metal cyanides which comprises providing a solution of a cyanide containing calcium cyanide, adding thereto a soluble heavy metal salt which forms a soluble salt with calcium and in sufficient quantity to form therewith a soluble double cyanide decomposable by acids, adding zinc chloride thereto, filtering and treating the resulting solution with an additional quantity of said heavy metal salt to precipitate the heavy metal cyanide.

10. The process of making heavy metal cyanides which comprises providing a solution of a cyanide containing calcium cyanide, adding thereto copper chloride in sufficient quantity to form calcium copper cyanide, filtering and treating the resulting solution with copper chloride to precipitate copper cyanide.

11. The process of making heavy metal cyanides which comprises providing a solution of a cyanide containing calcium cyanide, adding thereto copper chloride in sufficient quantity to form calcium copper cyanide, adding thereto sufficient zinc chloride to precipitate any iron present, filtering and treating the resulting solution with copper chloride to precipitate copper cyanide.

In testimony whereof I affix my signature.

KENNETH F. COOPER.